(12) United States Patent
Wanat

(10) Patent No.: US 7,220,047 B2
(45) Date of Patent: May 22, 2007

(54) CONTROL DIAL AND EJECTOR BUTTON FOR HANDHELD APPLIANCE

(75) Inventor: David J. Wanat, Meriden, CT (US)

(73) Assignee: Conair Corporation, Stamford, CT (US)

( * ) Notice: Subject to any disclaimer, the term of this patent is extended or adjusted under 35 U.S.C. 154(b) by 298 days.

(21) Appl. No.: 10/888,404

(22) Filed: Jul. 9, 2004

(65) Prior Publication Data

US 2005/0007868 A1 Jan. 13, 2005

Related U.S. Application Data

(60) Provisional application No. 60/485,901, filed on Jul. 9, 2003.

(51) Int. Cl.
*A47J 43/07* (2006.01)
*A47J 43/044* (2006.01)

(52) U.S. Cl. .................................................... 366/129

(58) Field of Classification Search ................ 366/129, 366/601, 344, 197, 199, 206; 310/50, 68 A
See application file for complete search history.

(56) References Cited

U.S. PATENT DOCUMENTS

| | | | | |
|---|---|---|---|---|
| 2,753,472 A | * | 7/1956 | Schott | 173/217 |
| 2,987,636 A | * | 6/1961 | Jepson | 310/50 |
| 3,224,826 A | * | 12/1965 | Kemnitz | 99/485 |
| 3,280,351 A | * | 10/1966 | Wolter et al. | 310/68 R |
| 3,333,825 A | * | 8/1967 | Wolter et al. | 366/129 |
| 3,443,795 A | * | 5/1969 | Gresens et al. | 366/129 |
| 3,533,600 A | * | 10/1970 | Gerson | 366/129 |
| 3,566,059 A | * | 2/1971 | Madan | 200/80 R |
| 3,595,093 A | * | 7/1971 | Du Bois et al. | 74/16 |
| 3,660,741 A | * | 5/1972 | Walter | 388/800 |
| 3,725,624 A | * | 4/1973 | Emmons | 366/129 |
| 3,821,902 A | * | 7/1974 | Du Bois et al. | 74/16 |
| 3,882,293 A | * | 5/1975 | Naples et al. | 200/430 |
| 3,904,178 A | * | 9/1975 | Scott et al. | 366/199 |
| 3,951,351 A | * | 4/1976 | Ernster et al. | 241/101.1 |

(Continued)

FOREIGN PATENT DOCUMENTS

JP 61-185232 * 8/1986

*Primary Examiner*—Charles E. Cooley
(74) *Attorney, Agent, or Firm*—Lawrence Cruz; Steven A. Garner

(57) ABSTRACT

A handheld mixer (10) has a body comprising a housing (12) that houses a motor and drive system and an integral handle (16), and one or more mixer attachments (20). A rotatable dial control (24) is rotatable about an axis (28) that is located within the housing (12) and, thus, only a portion of the dial (24) is exposed. The dial (24) is engaged by the user's thumb or finger of the same hand that is holding the device by its handle (16). The dial (24) comprises a smaller diameter dial (30) that is fixed to or integral with the manipulated dial (24) and which is positioned beneath a transparent surface (34) of the housing (12). The smaller dial (30) has markings that are viewed through the transparent surface (34) to indicate the larger dial position, such as "on/off"; "high/low"; and the like. Another novel feature of the present invention is an attachment eject button (36) that activates a lock to release a mixer attachment (20). The eject button (36) is positioned in close proximity to the novel dial (24) so that the user may engage the eject button (36) or the dial (24) without changing his or her grip on the handle (16).

2 Claims, 3 Drawing Sheets

U.S. PATENT DOCUMENTS 5,803,598 A * 9/1998 Harry et al. ................ 366/129
6,079,865 A * 6/2000 Plavcan et al. ............ 366/129
6,234,663 B1 * 5/2001 Lecerf et al. .............. 366/129
6,488,400 B1 * 12/2002 Masip et al. ................ 366/129
6,637,925 B1 * 10/2003 Beaudet et al. ............ 366/129
2005/0007868 A1 * 1/2005 Wanat ....................... 366/129

* cited by examiner

CONTROL DIAL AND EJECTOR BUTTON FOR HANDHELD APPLIANCE

CROSS-REFERENCE TO RELATED APPLICATIONS

This application claims priority to U.S. Provisional Patent Application Ser. No. 60/485,901 filed on Jul. 9, 2003, incorporated herein by reference in its entirety.

BACKGROUND OF THE INVENTION

1. Field of the Invention

The present invention relates to appliances such as food appliances and, more particularly, to a control dial and ejector button for a handheld appliance such as a food mixer.

2. Description of Related Art

It is known in the art to provide handheld, electric mixers comprising a body that houses an electric motor and drive system with an integral handle so that a user may hold the mixer in his or her hand during use. Known mixers of this type have a pair of chucks or similar attachment means for selectively attaching mixer attachments such as egg beaters or dough hooks. The pair of chucks are driven by the drive system and, thus, impart rotational movement to the mixer attachments. Operation of such handheld mixing devices is effected through manipulation of one or more controls that are in a variety of forms. The controls control various functions such as on/off, speed, lock/unlock of attachments and the like.

Known designs have shortcomings in that the physical shape and arrangement of the controls are inefficient to use or occupy relatively large amounts of space. This causes inconvenience to the user of the device, and unnecessary expense in materials.

It is desirable, therefore, to provide a handheld mixer that overcomes the abovementioned shortcomings of known handmixers, and that achieves further advantages that are inherent to the embodiments described below.

These and other objects are achieved by the present invention described herein.

BRIEF SUMMARY OF THE INVENTION

The present invention handheld mixer is directed to a body comprising a housing that houses a motor and drive system and an integral handle, and one or more mixer attachments. A novel feature of the present invention is a rotatable dial control that is rotatable about an axis that is located within the housing and, thus, only a portion of the dial is exposed. The dial is engaged by the uses thumb or finger of the same hand that is holding the device by its handle. The dial comprises a smaller diameter dial that is fixed to or integral with the manipulated dial and which is positioned beneath a transparent surface of the housing. The smaller dial has markings that are viewed through the transparent surface to indicate the larger dial position, such as "on/off"; "high/low"; and the like. Another novel feature of the present invention is an attachment eject button that activates a lock to release a mixer attachment. The eject button is positioned in close proximity to the novel dial so that the user may engage the eject button or the dial without changing his or her grip on the handle.

BRIEF DESCRIPTION OF THE DRAWINGS

FIG. 2b is a partial, perspective view of the component of FIG. 2a.

DESCRIPTION OF THE PREFERRED EMBODIMENT

Figure 3:
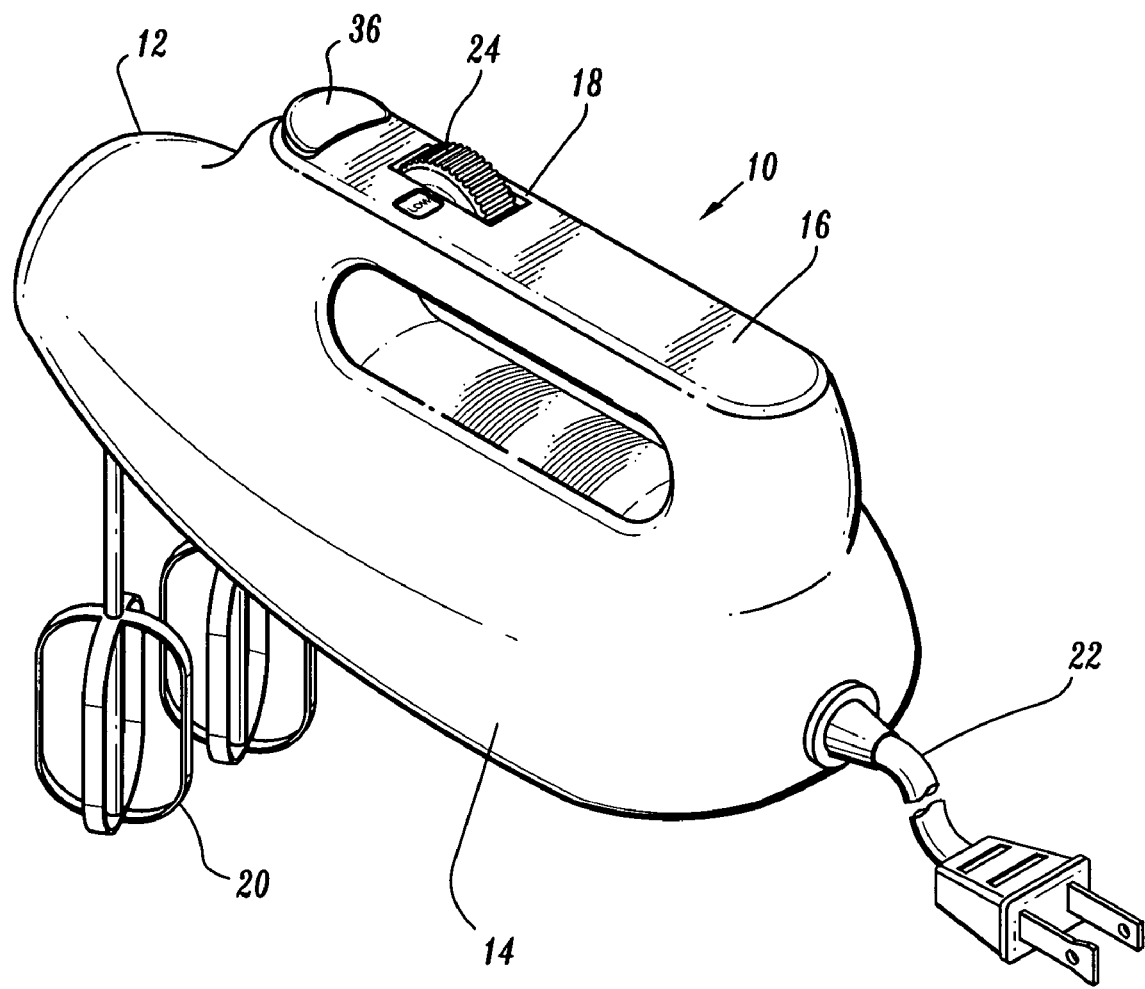
FIG. 3 is a schematic, perspective view of a handheld mixer according the present invention.

A handheld mixer (10) as shown in FIG. 3 comprises a housing (12) having a motor and drive chamber (14) and a handle portion (16) with a control panel (18) on the upper surface of the handle portion (16). One or more detachable mixer attachments (20) are provided and are adapted to be rotatably driven by an electric motor (not shown) and drive (not shown) of the type known to those skilled in the art and that is housed within the chamber (14). An electrical cord (22) delivers power from an external electric power source, though the device may be operated on batteries or a rechargeable source.

Figure 1:
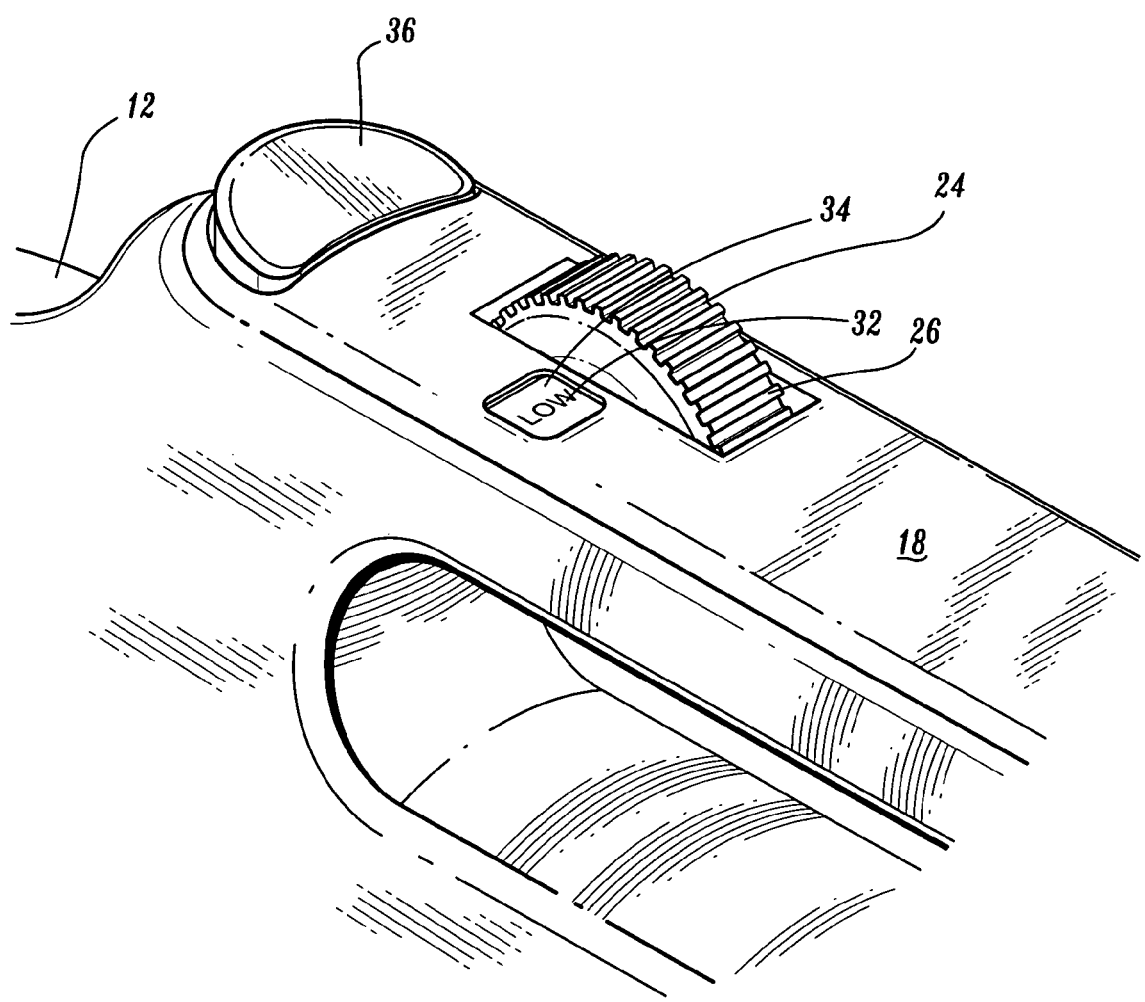
FIG. 1 is a partial, perspective illustration of a control panel of a hand mixer according to the preferred embodiment of the present invention.
Figure 2A:
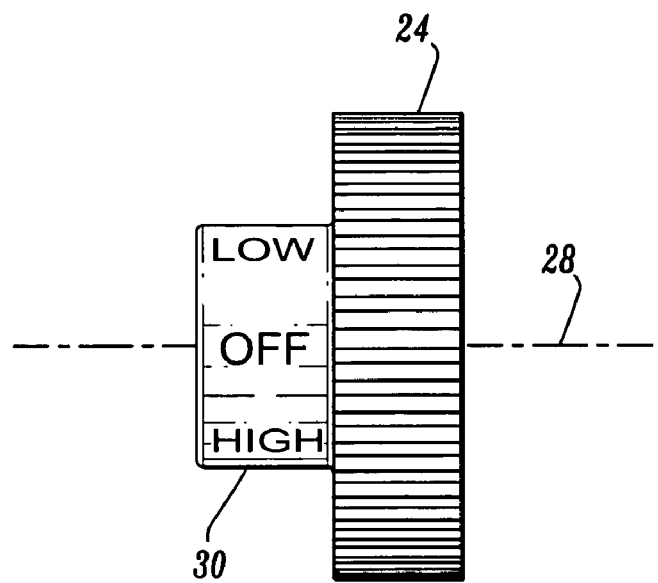
FIG. 2a is a partial, side view of a component of the present invention.
Figure 2B:
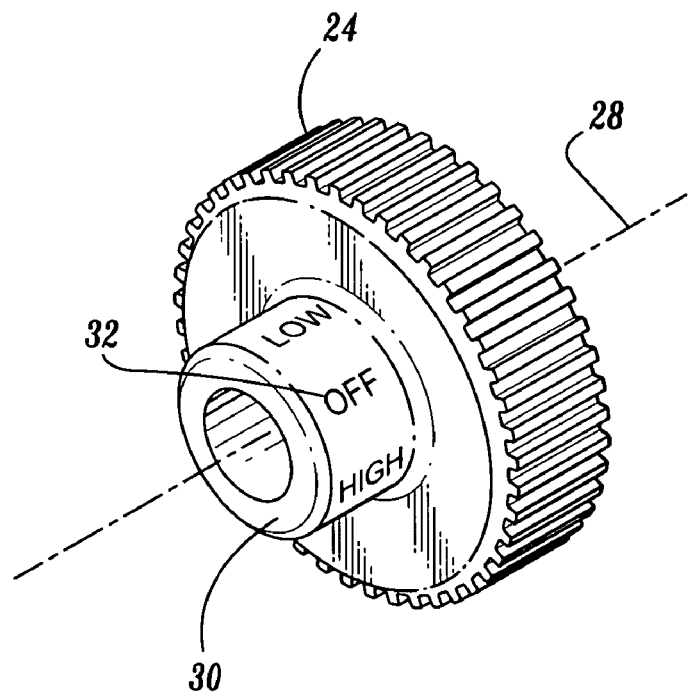

With reference to FIG. 1, a novel aspect of the present invention is directed to the control panel (18) and comprises a dial (24) being rotatably mounted within the housing (12) wherein a portion of the dial (24) is exposed or located outside of the housing (12). The exposed portion is engageable by a user's thumb or finger while the user is holding the handle portion (16) in the same hand. The dial (24) has a series of textured ribs (26) for positive gripping. Referring to FIG. 2a and FIG. 2b, the dial (24) is rotatable about an axis (28) and is provided with a second, smaller dial (30) that is unitary with or fixed to the dial (24). The smaller dial (30) rotates with the dial (24). The smaller dial (30) is provided with visible indicia (32), such as the words "off"; "low" or "high" to correspond to a position of the dial (24) that activates or stops operation of the motor and mixing attachments (20). The control panel (18) is provided with a transparent window (34) so that the user may see the indicia (32) through the window (34). The window (34), which may be made of plastic or other transparent material, protects the internal components of the mixer (10) be keeping moisture and contaminants outside of the housing.

Another novel aspect of the present invention is directed to an eject button (36) located in close proximity to the dial (24) such that a user who is holding the mixer (10) can manipulate the eject button (36) and the dial (24) with the same hand and without having to change grip on the handle portion (16). The eject button (36) is in mechanical or electrical relationship with a latch or lock (not shown) of the type generally known to those skilled in the art that serves to release an attached mixing attachment (20) for removal.

While the preferred present invention has been herein described, it is understood that various modification may be made without departing from the scope of the present invention.

What is claimed is:

1. A handheld mixer comprising:

a housing;

a motor and drive system within said housing;

a handle integral with said housing;

at least one attachment for mixing rotatably driven by said motor and drive system;

a control panel;

a first control dial rotatable about an axis located within said housing; and a second control dial fixed to said first control dial, wherein said second control dial is smaller in diameter than said first control dial and rotates with said first dial along said axis, wherein only a portion of said first control dial is exposed outside of said housing and wherein said control panel has a transparent surface covering said second control dial.

2. A handheld mixer comprising:
a housing;
a motor and drive system within said housing;
a handle integral with said housing;
at least one attachment for mixing rotatably driven by said motor and drive system;
a control panel;
a first control dial rotatable about an axis located within said housing; and
a second control dial integral with said first control dial, wherein said second control dial is smaller in diameter than said first control dial and rotates with said first dial along said axis, wherein only a portion of said first control dial is exposed outside of said housing and wherein said control panel has a transparent surface covering said second control dial.

* * * * *